UNITED STATES PATENT OFFICE.

GEORGE L. DAVISON, OF CHICAGO, ILLINOIS, ASSIGNOR TO AMERICAN SINTERING COMPANY, OF CHICAGO, ILLINOIS, A CORPORATION OF ILLINOIS.

SINTERING COMMINUTED ORE OR FLUE-DUST.

No. 811,040.      Specification of Letters Patent.      Patented Jan. 30, 1906.

Application filed November 4, 1905. Serial No. 285,941.

*To all whom it may concern:*

Be it known that I, GEORGE L. DAVISON, a citizen of the United States, residing at Chicago, in the county of Cook and State of Illinois, have invented a certain new and useful Process of Sintering Comminuted Ore and Flue-Dust, of which the following is a specification.

This invention relates to an improved process of sintering or agglomerating comminuted iron ore and flue-dust; and it has for its salient object to provide a process by the use of which the difficulties heretofore experienced in performing this art are largely or entirely eliminated.

As is well known by those familiar with the art of treating iron ores, there are large quantities of natural iron ores which are so fine or pulverulent that it is impractical to retain them in a blast-furnace long enough to reduce them. In other words, the ore is so fine that the blast blows it out of the furnace before fusion commences. It is also well known that considerable quantities of ore-dust and small particles of ore are blown out of the blast-furnace when reducing ore, which material, commingled with more or less coke and impurities, is known as "flue-dust." It has heretofore been proposed to agglomerate such comminuted ore and flue-dust in various ways, perhaps the most effective method being to subject the material to the action of a fusing-blast while it is passing through a rotary furnace and whereby it is agglomerated into masses of sinter. The present invention has to do with this general method of treatment, and the invention resides more particularly in the means whereby the material is agglomerated without fouling the interior of the furnace to such extent as to render it practically inoperative. It has heretofore been proposed to utilize pulverized or comminuted silicious slag mixed with a charge of comminuted ore or flue-dust to act as a bond in promoting the agglomeration of the material. It has also been proposed to use salt in the same manner for the same purpose. Both of these methods are unsatisfactory, the use of the slag being objectionable because of the relatively large percentage thereof which must be added in order to effect the necessary agglomeration and the consequent lowering of the quality or the percentage of iron in the sinter thus produced, as well as the cost of comminuting and adding the slag, and the use of the salt is found unsatisfactory because of the great tendency of the sinter produced by the use of this flux to adhere to the interior of the furnace and form clinkers thereon, which greatly interfere with the operation of the furnace or render it practically inoperative.

I have discovered that by using the mineral fluor, either as derived from nature or as derived as a by-product in the treatment of certain minerals, in lieu of slag, salt, or other fluxing material the comminuted ore or flue-dust is caused to properly agglomerate without any marked tendency to adhere to the walls of the furnace.

The approved manner of carrying out my process is as follows: I first pulverize or comminute the fluor to a sufficiently fine condition to enable it to be thoroughly and quite evenly commingled with the comminuted ore or flue-dust. I then mix with the ore or flue-dust to be treated, while in dry or substantially dry condition, about one per cent. of the fluor. I then pass the material to be treated continuously and in graduated quantities through a tubular rotary furnace—such, for example, as a rotary cement-furnace—the body of the furnace being inclined slightly from the horizontal and the ore being fed into the upper end and gradually tumbled through the furnace by the continued rotation of the latter. The reducing-flame is produced by means of fuel blown in at the delivery end of the furnace and passes through the furnace in a direction opposite that in which the ore passes therethrough. By properly regulating the rate of feed, rate of rotation of the furnace, and temperature the ore arrives at the discharge end of the furnace in the form of masses of agglomerated clinker of suitable size to charge into the blast-furnace for ultimate reduction. The mineral fluor is comparatively refractory and requires to be brought to a comparatively high degree of heat before the fusion in the presence of the ore commences. Moreover, it is a true flux in the sense that it chemically combines and induces the ore to fuse at a temperature readily attainable in such a furnace, from which it follows that a comparatively small percentage of the fluxing mineral is required, only sufficient to initiate the fusion of the ore itself sufficiently to bring about the agglomeration. Owing to the fact that the fluor is comparatively refractory, the actual agglomeration commences and is accomplished near the discharge end of the furnace instead of being distributed throughout a considerable length of the furnace, and this fact in itself greatly lessens the difficulty due to the tendency of the material to adhere to the walls of the furnace. The relatively small percentage of flux used obviously maintains the percentage of iron in the agglomerate high, so that its ultimate reduction in the blast-furnace is economical. While the action of the fluor is analogous to the action of salt in that it is a true flux, it nevertheless is not volatile nor susceptible of fusion at a comparatively low temperature, as is the salt, and hence the zone of agglomeration in the furnace, as before explained, is narrow. The fluxing action caused by the fluor produces a sinter which is much less viscid in character, and accordingly the tendency to adhere to the walls of the furnace is minimized to such extent as to render the operation of sintering continuously for long periods of time practical.

I claim as my invention—

1. The process of sintering comminuted ore or flue-dust which consists in mixing the ore or flue-dust with a small percentage of comminuted fluor, then passing the mixture gradually through a furnace and heating it until the mixture fuses sufficiently to cohere, and agglomerating the mixture into lumps by agitation while thus in partially-fused condition.

2. The process of sintering comminuted ore or flue-dust which consists in mixing the ore or flue-dust in substantially dry condition with a small percentage of dry or substantially dry comminuted fluor, then passing the mixture gradually through a rotary furnace and heating it to a temperature which causes the mixture to partially fuse and causing the mixture to agglomerate into lumps by tumbling it repeatedly while thus in partially-fused condition.

3. The process of continuously sintering comminuted ore or flue-dust which consists in preparing a mixture of the ore or flue-dust with approximately one per cent. of comminuted fluor, then passing such mixture gradually and continuously in controlled quantities through a furnace and gradually heating it while passing through the furnace to a temperature at which the mixture fuses sufficiently to cohere and effecting an agglomeration of the mixture into lumps by repeated tumbling of the material while in partially-fused condition.

GEORGE L. DAVISON.

Witnesses:
R. H. BOWLBY,
E. B. CLARK.